United States Patent [19]

Kullmann

[11] 4,267,474

[45] May 12, 1981

[54] COOLING ARRANGEMENT FOR THE ROTOR OF AN ELECTRIC MACHINE

[75] Inventor: Dieter Kullmann, Langenzenn, Fed. Rep. of Germany

[73] Assignee: Siemens Aktiengesellschaft, Berlin & Munich, Fed. Rep. of Germany

[21] Appl. No.: 55,522

[22] Filed: Jul. 9, 1979

[30] Foreign Application Priority Data

Jul. 13, 1978 [DE] Fed. Rep. of Germany ....... 2830887

[51] Int. Cl.³ ............................................. H02K 9/00
[52] U.S. Cl. ...................................... 310/52; 310/261
[58] Field of Search ....................... 310/10, 40, 52, 54, 310/61, 64, 261

[56] References Cited

U.S. PATENT DOCUMENTS

| | | | |
|---|---|---|---|
| 3,809,933 | 5/1974 | Sugawara | 310/40 |
| 3,816,780 | 6/1974 | Smith | 310/52 |
| 4,013,908 | 3/1977 | Weghaupt | 310/52 |
| 4,037,124 | 7/1977 | Kullman | 310/52 |
| 4,060,743 | 11/1977 | Weghaupt | 310/10 |
| 4,085,343 | 4/1978 | Hasegawa | 310/52 |
| 4,091,298 | 5/1978 | Gamble | 310/10 |
| 4,151,639 | 5/1979 | Weghaupt | 310/54 |
| 4,171,494 | 10/1979 | Yamaguchi | 310/52 |
| 4,176,292 | 11/1979 | Kalsi | 310/52 |

*Primary Examiner*—R. Skudy
*Attorney, Agent, or Firm*—Kenyon & Kenyon

[57] ABSTRACT

A cooling arrangement for the rotor of an electric machine having a superconducting field winding and a co-rotating mixing chamber containing a phase mixture of a coolant has a coolant distribution system arranged at the outer circumference of the field winding which feeds coolant into cooling canals through the field winding into the mixing chamber. There are also corresponding coolant connecting lines outside the winding, at least one coolant feed line connected to the coolant distribution system for supplying coolant from the outside, and a discharge for the gaseous coolant at a pressure below $10^5$ Pa. In this cooling arrangement, cooling of the field winding is advantageously brought about by self-pumping. Simple and effective cooling-down is achieved.

15 Claims, 2 Drawing Figures

COOLING ARRANGEMENT FOR THE ROTOR OF AN ELECTRIC MACHINE

BACKGROUND OF THE INVENTION

1. Field of the Invention

This invention relates to an arrangement for cooling the rotor of an electric machine having a superconducting field winding and a co-rotating mixing chamber near the axis, which, during operation contains a phase mixture of a coolant supplied from the outside and from which liquid coolant for cooling the field winding is taken and to which the coolant is returned, discharge of gaseous coolant to the outside being provided for.

2. Description of the Prior Art

Such a cooling arrangement is described in the dissertation by A. Bejan: "Improved Thermal Design of the Cryogenic Cooling System for a Superconducting Synchronous Generator," Ph.D. Thesis, Massachusetts Institute of Technology (U.S.A.), December, 1974, page 151. In this cooling arrangement, a coolant, taken from an external coolant supply unit and expanded in a Joule-Thomson valve, is fed via a central coolant feed line to a co-rotating mixing chamber. As a result of Joule-Thomson expansion, a two-phase mixture of liquid and gaseous coolant is then contained in the mixing chamber. During rotating operation, the phases of this two-phase mixture are separated by the centrifugal forces acting on them, and the coolant vapor is collected in regions near the axis, and the coolant liquid, in regions away from the axis of the mixing chamber. A stream of liquid coolant is fed from the mixing chamber via radially disposed feed lines to the field winding, for instance, at an end face. The coolant then flows through the field winding in a direction parallel to the axis of rotation and is thereupon returned to the central mixing chamber via another radially disposed discharge line. The heat absorbed in the process causes the temperature of the coolant to rise and results in partial evaporation. The required pumping action for developing coolant flow through the field winding is brought about by a self-pumping effect based on density differences. The insentropically compressed coolant conducted radially outward in the feed lines is accelerated by the centrifugal forces and can thus pass into the field winding. Since it is warmed up by the dissipation occurring there or by heat transfer from the outside, its density decreases and a hydrostatic pressure difference occurs between the radial feed and return lines. Therefore, a pressure gradient develops along the winding between the inlet and the outlet point of the coolant, which leads to convection flow and causes the coolant to return, via the discharge lines, to the mixing chamber near the axis. (c.f., "Cryogenics," July 1977, pages 429 to 433, and German Offenlegenschrift No. 25 30 100).

In such a cooling arrangement, however, difficulties arise during the cooling-down phase of the field winding, since, during this phase, the rotor is not yet rotating or is rotating at low speed, so that there is practically no centrifugal force to urge the cold coolant into the still warm field winding. When the coolant enters the field winding, it is warmed up and evaporates and the gaseous coolant then forms a buffer which blocks the still colder coolant from flowing in. Additional steps must, therefore, be taken to ensure uniform cooling-down of the field winding during the cooling down phase. Usually, forced cooling is provided for this purpose. However, with this type of cooling, difficulties arise in later utilizing the above-mentioned self-pumping effect after the cooling-down phase has taken place.

It is therefore an object of the present invention to provide a cooling arrangement for the superconducting field winding of a rotor, in which these difficulties do not occur or are minimized. In particular, the cooling arrangement is to utilize the self-pumping effect when the apparatus is in operating condition, and it should also carry out cooling of the field winding during the cooling-down phase, in a way which is technically simple and effective from the point of view of heat exchange.

SUMMARY OF THE INVENTION

For a cooling arrangement of the type mentioned above, this problem is solved by providing a coolant distribution system at the outer circumference of the field winding from which cooling canals extend through the winding parts of the field winding to the mixing chamber and which has associated connecting lines outside of the winding parts, there being at least one coolant feed line connected to the coolant distribution system for supplying coolant from the outside. The gaseous coolant is discharged at a pressure below $10^5$ Pa.

This cooling arrangement has the particular advantage that coolant always flows, absorbing heat, from the outside in, through the field winding, during the cooling-down phase, regardless of the speed of rotation. Therefore, since the impressed flow direction of the coolant always coincides with the direction of decreasing density from the outside in, flow instabilities cannot occur. The coolant warmed up in the winding parts of the field winding then flows radially inward into the mixing chamber via the cooling ducts. Buffers of warmer coolant gas which prevent colder coolant from flowing into field winding during the cooling-down phase, do not, therefore, develop.

During operation, the gaseous coolant is discharged from the mixing chamber by pumping it off. Thereby, the temperature rise generated in the radial direction can be compensated for by compression of the coolant due to centrifugal force. In this manner, temperatures of, for instance, less than 4.2 K. can be obtained everywhere in the field winding when the coolant is fed into the rotor at the appropriate reduced pressure and the appropriate temperature. In such a case, Joule-Thomson expansion is usually provided for in the feed line.

When, on the other hand, normal-boiling coolant is to be supplied at pressures of about $10^5$ Pa, it is a further feature of the invention that the coolant feed line connected to the coolant distribution system contains a line section which is constructed as a heat exchanger in which a heat exchange with coolant from the mixing chamber takes place. In particular, the line section designed as a heat exchanger can be disposed radially, at least approximately, with respect to the axis of the rotor. In this way the coolant, which is introduced into the rotor in the vicinity of the axis and flows radially, from the inside, out into the coolant distribution system, is kept from being adiabatically compressed and consequently warmed up in the process. Therefore, Joule-Thomson expansion in this line section for compensating such heating-up can also be dispensed with and boiling helium, at normal or only slightly elevated overpressure, can be introduced into the coolant feed line.

BRIEF DESCRIPTION OF THE INVENTION

FIG. 1 is a view in longitudinal cross-section, of part of a rotor having a cooling arrangement in accordance with the teachings of the invention; and FIG. 2 is a view in cross-section taken through the rotor of FIG. 1 along the lines II—II.

DETAILED DESCRIPTION OF THE INVENTION

Figure 1:
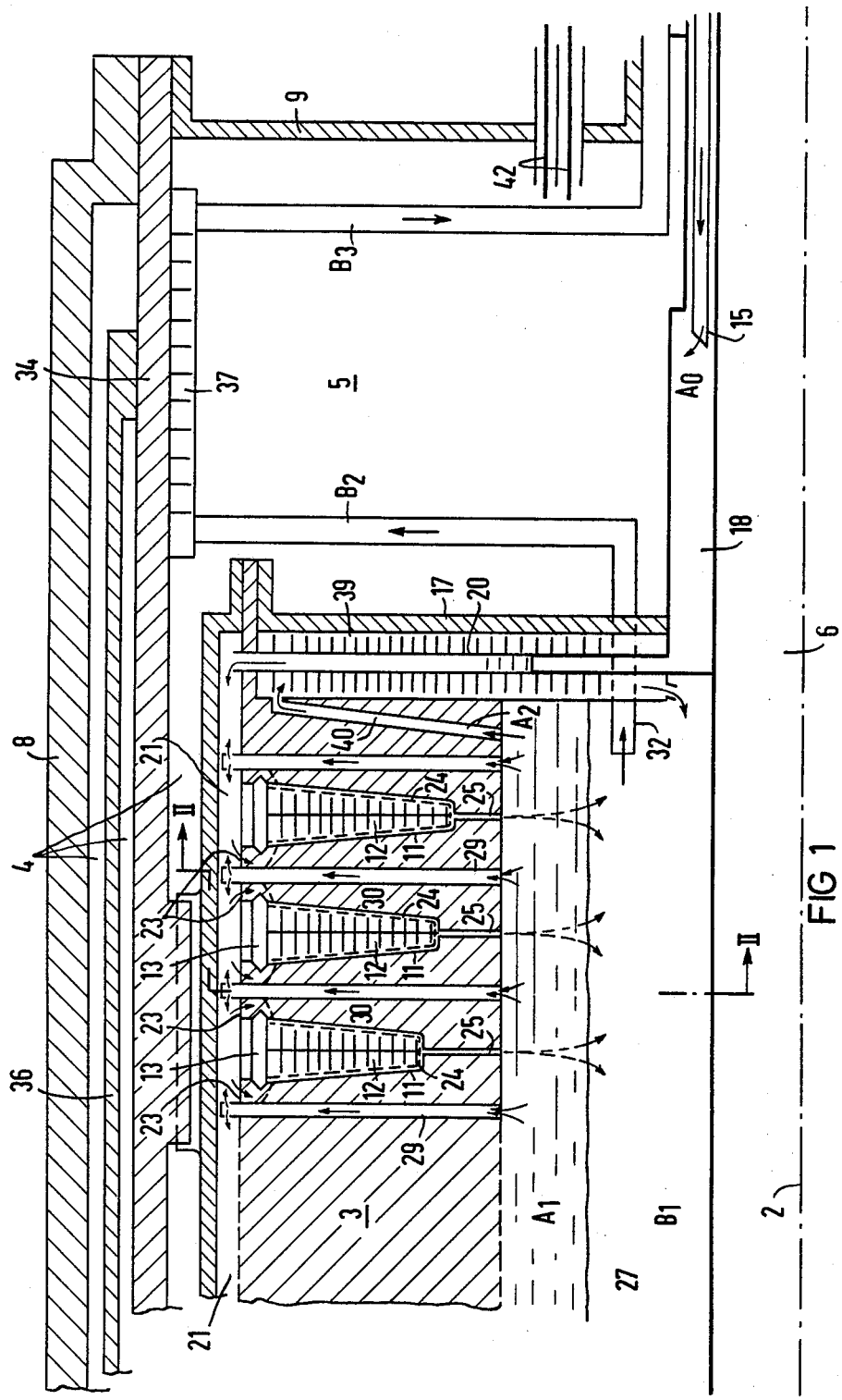

In FIG. 1, the flow of a coolant through a part near the coil ends, of the rotor 3 of an electric machine, especially a turbo-generator, is illustrated. Rotor parts not specially detailed in the figure can, for instance, correspond to parts of such a machine as shown in U.S. Pat. No. 4,060,743. In FIG. 1, the upper half of a rotor having a cooling arrangement, according to the invention, is shown in longitudinal cross-section. The rotating parts of the machine to be cooled are arranged in a vacuum in order to limit heat inflow from outside into these parts. Rotor body 3 of the machine, concentrically supported about an axis 2, is therefore surrounded by vacuum spaces 4, 5 and 6 enclosed within a hollow cylindrical housing part 8 and a disc-like housing part 9 at the end face of a co-rotating vacuum housing, which is at room temperature or above. The disc-shaped end part 9 of the vacuum housing is, at the same time, part of a connecting head, not shown in detail, of the rotor. Rotor body 3 is provided, on its outside, with slots 11, into which the turns of a field winding 12 are placed. These winding parts of the field winding are held in slots 11 by wedges 13. The conductors of winding 12 contain superconductive material for which helium is provided as the coolant. The flow directions of individual coolant streams established during operation of the machine are illustrated by arrows.

A coolant $A_o$, preferably normal-boiling helium at a pressure of $1.2 \times 10^5$ Pa and a temperature of 4.4 K., is supplied from coolant supply equipment not shown in the figure and fed into the rotor via a helium coupler at the connecting head, and is not further detailed. By means of such a helium coupler, as described for instance, in the publications "Siemens Forchungs- und Entwicklungsberichte 11," vol. 5(1976) no. 1, page 13, the coolant $A_o$ is transferred from stationary to rotating machine parts. The coolant $A_o$ is then introduced via stationary feed line 15, which extends into the rotor near the axis, into a co-rotating antechamber 18 located at the face 17 of rotor body 3. The feed line may consist of a double tube, concentric with axis 2, having a coolant conduction space of annular cross-section, or of several individual tubes which together lie on the surface of a cylinder. At least one radial coolant feed line 20 is connected to antechamber 18 and extends radially, away from rotor axis 2, to introduce the coolant into a coolant distribution system 21 which is arranged on the outer circumference of field winding 12. Coolant distribution system 21, which consists of coolant lines connected to each other in network fashion and extending parallel to the axis and in the circumferential direction of the rotor, supplies coolant, via inlet openings 23 running from the outer edge of slots 11 into cooling canals 24. Coolant canals 24 run substantially radially, with respect to the rotor axis 2, through the parts of field winding 12 which are arranged in slots 11. Coolant that has arrived at the bottom of slots 11 is conducted, away, via radial coolant tubes 25, into mixing chamber 27 arranged in the interior of the rotor.

During operation, chamber 27 contains a two-phase mixture of liquid coolant $A_1$ and gaseous coolant $B_1$. Upon rotation, phase separation takes place, under the influence of centrifugal force, and the heavier liquid coolant $A_1$ is deposited concentrically around the gaseous coolant $B_1$ which is held along rotor axis 2.

For cooling superconducting field winding 12, a closed circuit is provided, in which a self-pumping effect is utilized. To this end there are provided, between the coolant distribution system 21, at the outer circumference of the field winding 12, and the mixing chamber 27, radially arranged coolant connecting lines 29 which run in the tooth-like intermediate bodies 30 located between adjacent slots 11 in rotor body 3. Cold coolant $A_1$ is transported via connecting lines 29 from mixing chamber 27 into coolant distribution system 21 and passes from there into connected canals 24 in the superconducting winding. Due to the heat reflux from outside of the machine, the coolant in the coolant lines of coolant distribution system 21 is warmed up. In addition, it is warmed up by the dissipation of heat produced in the winding parts of field winding 12. The reduction of the coolant density connected therewith causes a reduction of the hydrostatic pressure on the cold coolant in connecting lines 29. Because of this pressure decrease, the coolant flows radially inward, via canals 24 and tubes 25, back into mixing chamber 27.

Evaporated coolant, which, during operation, flows into mixing chamber 27, is discharged to the outside via an exhaust gas line 32. Here, too, a self-pumping effect is used for suctioning off the gaseous coolant $B_2$. The coolant taken off via tube 32, at a point near the axis, is warmed up by being used to cool a connecting part 34 between the co-rotating warm vacuum housing 8 and 9 and colder parts of the rotor. Such a colder rotor part may be, for example, a radiation shield 36 which acts as an electromagnetic damper. A heat exchanger 37, in which the coolant $B_2$ rises, at least approximately, to the temperature of vacuum housing 8 and 9, is therefore attached to the connecting piece 34 away from the axis. The coolant gas $B_3$ warmed up in this manner is then conducted centrally from the rotor, at the connecting head, in a way not detailed in the figure, and fed to a refrigeration machine. Due to the self-pumping effect for pumping-off coolant gas $B_2$, $B_3$, an underpressure of less than $10^5$ Pa advantageously then occurs in exhaust gas pipe 32.

In order to prevent adiabatic compression heating of coolant conducted from antechamber 18, via coolant feed line 20, into coolant distribution system 21, the radial part of this line is designed as heat exchanger 39, through which liquid coolant $A_2$, taken from mixing chamber 27, is fed, via a line 40, to the heat exchanger parts away from the axis and is returned to mixing chamber 27 at a point near the axis. The flow through the heat exchanger 39 is likewise effected by self-pumping.

During the cooling-down phase, when the rotor is not yet rotating or is rotating only at a low speed, and when there are as yet, therefore, no large centrifugal forces to act on the coolant and the field winding 12 is still warm, the coolant $A_o$ is first introduced, in the cooling arrangement according to the invention, into the coolant distribution system 21 which is located at the outer edge of the winding through feed line 20. This results in formation of a steep temperature gradient between the parts of rotor body 3 lying near the axis and the distribution system lying away from the axis. The temperature gradient leads to a flow of coolant in a direction coincident with the pressure difference impressed from the outside of distribution system 21, through canals 24, 25 and also through connecting lines 29, into mixing chamber 27.

After mixing chamber 27 is partially filled with liquid coolant $A_1$ and rotor 3 is brought to its intended speed, the operating state of the machine adjusts itself automatically and the cooling of field winding 12 is brought about by the two self-pumping effects described. The evaporated portion of coolant $B_2$, $B_3$, conducted to the outside, is then replaced by liquid coolant $A_o$ supplied from the outside.

In FIG. 1, exhaust gas-cooled current supply lines 42 for field winding 12, which are brought to the outside at end face 9 of the vacuum housing or at the terminal head of the rotor, are also shown.

In the apparatus of FIG. 1, a single coolant feed line 20 is provided at a coil end. Such a feed line may also be provided at the opposite end face of the rotor body; in this case a connecting line from antechamber 18, running parallel to the axis, through mixing chamber 27, must be provided. The function performed by coolant feed line 20, at one end face of the rotor, may be performed at both ends or by appropriate feed lines arranged at points between the end faces of the rotor body, as will be understood by those skilled in the art.

Also, in the illustrative embodiment of FIG. 1, cooling canals 24 through the field winding are arranged radially, at least approximately, with respect to rotor axis 2 and lie at the boundary surfaces between the turns of field winding 12 and slot teeth 30. However, radial cooling canals can also be provided which are not located at the edges of the individual winding packages but extend through them.

Figure 2:
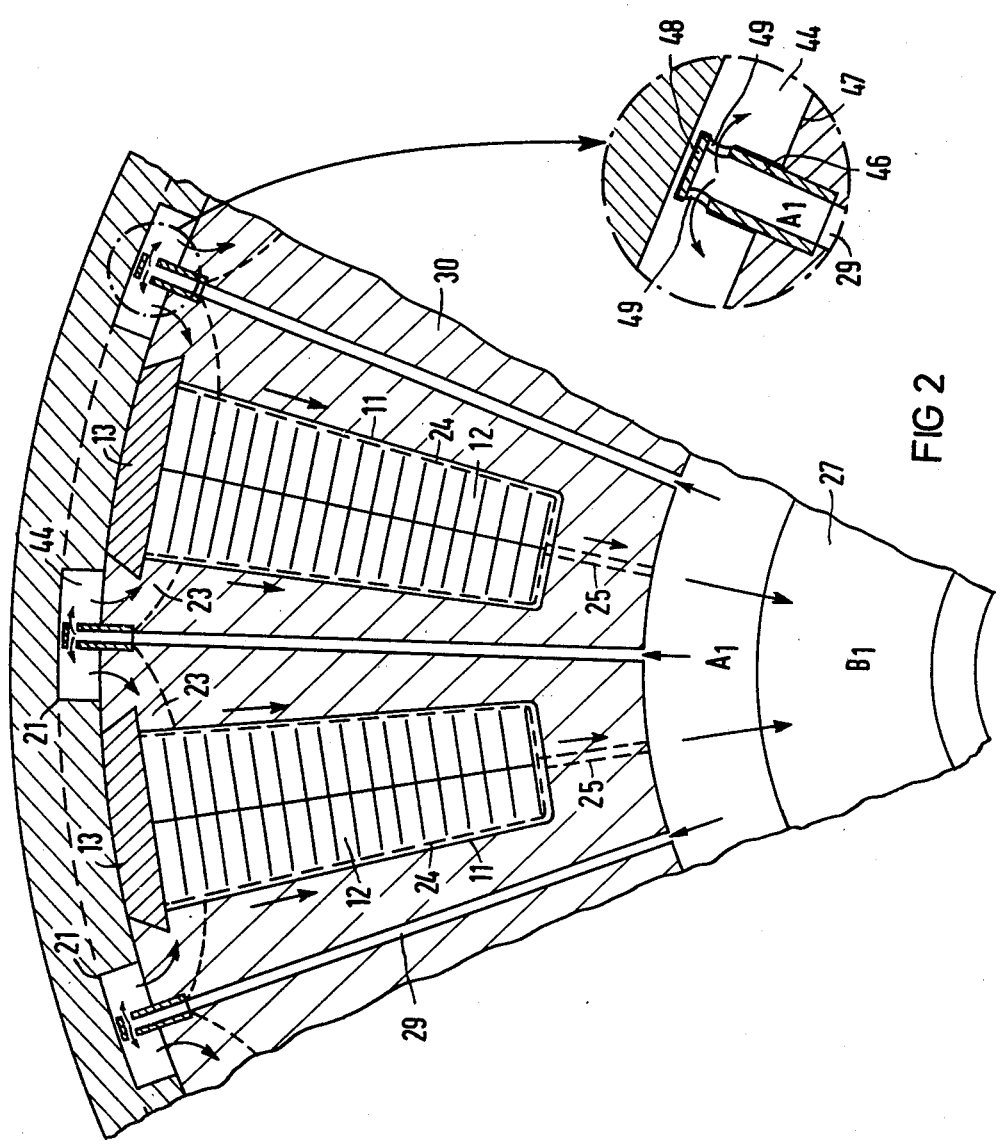

In FIG. 2, a cross-section through rotor 3 of FIG. 1 is shown. The plane along which the cross-section is taken is marked II—II in FIG. 1. Several radial coolant connecting lines 29 lie in this plane, through which liquid coolant $A_1$ is conducted from central mixing chamber 27 to coolant distribution system 21 at the outer circumference of the field winding. Several distribution canals 44 of coolant distribution system 21 are also shown; they run in a direction parallel to the axis. Coolant connecting lines 29 protrude somewhat above the bottom surfaces 47 of canals 44; e.g. the surfaces nearest the axis. The outer ends 48 of coolant lines 29 are closed off and the lines have lateral openings 49, adjacent thereto, through which coolant can exit into canals 44. This measure insures that cold coolant already issued from openings 49 is first warmed by heat emanating from warmer parts of the body and then flows in the direction of inlet openings 23 into slots 11, and is restrained from travelling radially inward within connecting lines 29. In this manner, a defined flow direction from outside in, through the field winding, is ensured.

What is claimed is:

1. In a cooling arrangement for the rotor of an electric machine having a superconducting field winding and a co-rotating mixing chamber near the axis, which, during operation, contains a phase mixture of a coolant supplied from the outside, liquid coolant for cooling the field winding being taken from the mixing chamber and returned to it after being conducted through the field winding, and from which a discharge of gaseous coolant to the outside is provided, the improvement comprising:

(a) a coolant distribution system disposed at the outer circumference of the field winding;
(b) cooling canals and coolant connecting lines running between the coolant distribution system and the mixing chamber, said cooling canals running through the winding parts of the field winding and said coolant connecting lines running outside the winding parts;
(c) at least one coolant feed line connected to the coolant distribution system for supplying coolant from outside the rotor; and
(d) means for discharging the gaseous coolant at a pressure below $10^5$ Pa.

2. The cooling arrangement of claim 1 in which the coolant is fed into the rotor from a stationary feed line at a pressure of at least $10^5$ Pa.

3. The cooling arrangement of claim 2 in which the coolant fed in its normal-boiling helium at a pressure of about $1.2 \times 10^5$ Pa.

4. In a cooling arrangement according to claim 1, the further improvement comprising the cooling canals through the winding parts of the field winding being arranged substantially radially with respect to the rotor axis.

5. In a cooling arrangement according to claim 1, the further improvement comprising the coolant feed line which is connected to the coolant distribution system having a section designed as a heat exchanger.

6. The cooling arrangement of claim 5, further comprising the heat exchanger being arranged for heat exchange with coolant taken from the mixing chamber.

7. In a cooling arrangement according to claim 5 or claim 6, the further improvement comprising the section of coolant feed line designed as a heat exchanger being substantially radially disposed with respect to the axis of the rotor.

8. In a cooling arrangement according to one of claims 1, 4, 5 or 6, the further improvement comprising at least one coolant feed line being located at at least one of the two end faces of the rotor body.

9. In a cooling arrangement according to one of claims 1, 4, 5 or 6, the further improvement comprising at least one coolant feed line being located in the part of the rotor located between the two end faces of the rotor body.

10. In a cooling arrangement according to claim 1, the further improvement comprising the coolant distribution system having coolant lines which are connected to each other and which extend parallel to the axis of the rotor as well as circumferential to the rotor.

11. In a cooling arrangement according to one of claims 1, 4 or 10, the further improvement comprising the rotor body containing slots for receiving the field winding and having tooth-like intermediate bodies in between, in which the radial cooling canals are arranged inside the slots at the boundary surface between the winding parts of the field winding and the tooth-like intermediate bodies.

12. In a cooling arrangement according to claim 11, the further improvement comprising the coolant connecting lines being arranged in the tooth-like intermediate bodies.

13. In a cooling arrangement according to one of claims 1, 4, or 10, the further improvement comprising the liquid coolant being taken from the mixing chamber for cooling the field winding and then returned to the mixing chamber by a self-pumping effect.

14. In a cooling arrangement according to claim 7, the further improvement comprising the flow of coolant through the heat exchanger taking place due to a self-pumping effect.

15. In a cooling arrangement according to claim 1 the further improvement comprising the discharge of gaseous coolant to the outside taking place due to a self-pumping effect.

* * * * *